Patented June 15, 1954

2,681,286

UNITED STATES PATENT OFFICE 2,681,286

EGG DRYING

Lloyd B. Jensen, Chicago, and Cedric Hale, Glen Ellyn, Ill., assignors to Swift & Company, Chicago, Ill., a corporation of Illinois No Drawing. Application October 1, 1951, Serial No. 249,226

4 Claims. (Cl. 99—210)

The present invention relates in general to a method for treating eggs, and more specifically to a method for treating fermented, dried egg whites to improve the whipping properties thereof and to the resulting product thereof.

Dried egg products are now produced on a large scale commercially and have proven highly successful due to the ease of shipment and storage thereof. It has heretofore been recognized that the whipping and keeping properties of dried egg whites are greatly improved by the fermentation treatment of the egg material before drying.

However, the whipping qualities of fermented, dried egg whites will vary substantially with each vat of eggs, even though the eggs are from substantially the same sources. Consequently, in large scale manufacture of fermented, dried egg powder, a large number of batches having relatively poor whipping qualities are obtained. If these batches are admixed with better quality batches, the result is to lower the overall quality of the manufacturer's product.

It is, therefore, an object of the present invention to provide a method for improving the whipping properties of dried, fermented egg whites.

It is a further object of this invention to provide an improved dried egg product having consistently good whipping properties.

Additional objects if not specifically set forth herein will be readily apparent from the following detailed description of the invention:

It has now been discovered that egg powder possessing poor whipping properties may be greatly improved with respect to such properties by the addition thereto of a small amount of acetoin (acetyl-methylcarbinol). This whip-improving agent is preferably added directly to the dried egg albumin, but may, if desired, be added to the egg material while it is undergoing fermentation. The acetoin is easily stirred into or mixed with the egg material to give a uniform distribution of acetoin throughout the material. Amounts of the whip-improving agent ranging from about 0.001 per cent to 1.0 per cent by weight of egg albumin (dried) produce marked improvement in the whipping properties of the egg material.

As an illustration of the improvement in whipping properties of dried egg albumin effected by the present method, the following example is furnished:

Example

A sample of dried egg whites, fermented in the conventional manner, was whipped with water and the specific gravity of the resultant foam measured. This was found to be 0.240, which is considered very poor in the art.

An identical sample from the same batch of dried egg whites was then treated with 0.5 cc. of acetyl-methylcarbinol per 13 grams dried product and the sample mixed to uniformly distribute the acetyl-methylcarbinol. This treated sample was then whipped with water in an identical manner to the whipping of the control sample above. The specific gravity of the resultant foam was found to be 0.115, which is considered to be excellent in the art.

The egg material to be treated by the present method may be fermented and dried in any of the conventional manners known to the art. Further, the whip-improving agent of the present invention may be added to the egg material prior to drying, although preferably it is added to the dried powder.

Obviously, many modifications and variations of the invention as hereinbefore set forth may be made without departing from the spirit and scope thereof, and therefore only such limitations should be imposed as are indicated in the appended claims.

We claim:

1. The method of improving the whipping properties of fermented, dried egg whites which comprises adding to said egg whites a small but perceptible amount not exceeding about 1.0 per cent by weight of acetyl-methylcarbinol.

2. The method of improving the whipping properties of fermented, dried egg whites which comprises incorporating into said dried egg whites from about 0.001 per cent to about 1.0 per cent by weight of acetyl-methylcarbinol.

3. A dried egg product having improved whipping properties comprising a mixture of fermented, dried egg whites with a small but perceptible amount not exceeding about 1.0 percent by weight of acetyl-methylcarbinol.

4. A product as in claim 3 wherein the acetyl-methylcarbinol is present in an amount ranging from about 0.001 per cent to 1.0 per cent by weight of the dried egg whites.

References Cited in the file of this patent

UNITED STATES PATENTS

| Number | Name | Date |
|---|---|---|
| 2,237,827 | Fischer | Apr. 8, 1941 |
| 2,447,063 | Frey et al. | Aug. 17, 1948 |
| 2,465,875 | Hopkins | Mar. 29, 1949 |